United States Patent
Atkins et al.

(10) Patent No.: US 11,027,821 B2
(45) Date of Patent: Jun. 8, 2021

(54) CONTROL METHOD FOR PREVENTING DIFFERENCES BETWEEN ROTOR TILT ANGLES IN A FLY-BY-WIRE TILTROTOR AIRCRAFT

(71) Applicant: Bell Helicopter Textron Inc., Fort Worth, TX (US)

(72) Inventors: Brady Garrett Atkins, Euless, TX (US); Michael David Trantham, Arlington, TX (US); Paul David Ruckel, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 567 days.

(21) Appl. No.: 15/876,420

(22) Filed: Jan. 22, 2018

(65) Prior Publication Data
US 2019/0225322 A1 Jul. 25, 2019

(51) Int. Cl.
*B64C 13/16* (2006.01)
*B64C 29/00* (2006.01)
*B64C 13/50* (2006.01)

(52) U.S. Cl.
CPC ............ *B64C 13/16* (2013.01); *B64C 13/503* (2013.01); *B64C 29/0033* (2013.01); *B64C 29/0075* (2013.01)

(58) Field of Classification Search
CPC ... B64C 13/16; B64C 13/503; B64C 29/0033; B64C 29/0075
See application file for complete search history.

(56) References Cited

U.S. PATENT DOCUMENTS

| | | | | |
|---|---|---|---|---|
| 3,514,052 A | * | 5/1970 | McKeown | ......... B64C 29/0033 244/12.3 |
| 3,592,412 A | * | 7/1971 | Glatfelter | ............ B64C 29/0033 244/7 A |
| 8,454,475 B2 | | 6/2013 | Ehinger et al. | |
| 2009/0312891 A1 | * | 12/2009 | Builta | ................. B64C 29/0033 701/3 |
| 2016/0209290 A1 | | 7/2016 | Shue | |

FOREIGN PATENT DOCUMENTS

WO  WO-2008111952 A2  9/2008

* cited by examiner

*Primary Examiner* — Justin M Benedik
(74) *Attorney, Agent, or Firm* — Shackelford, Bowen, McKinley & Norton, LLP

(57) ABSTRACT

A system and method for preventing a maximum asymmetric condition between pylon tilt angles due to a degraded pylon in a fly-by-wire tiltrotor aircraft during transitions between airplane mode and helicopter mode includes a conversion system for imparting movement on a right and left pylon. A flight control computer is operatively connected to a set of transducers for measuring pylon angles. The flight control computer is further connected to a set of actuators which are attached to each pylon. The flight control computer receives flight dynamics input from the set of transducers and/or the pilot and sends pylon command to the set of actuators. The conversion system measures the difference between the pylon angles during the transition and provides a pylon command adjustment if the difference exceeds a preset threshold.

20 Claims, 6 Drawing Sheets

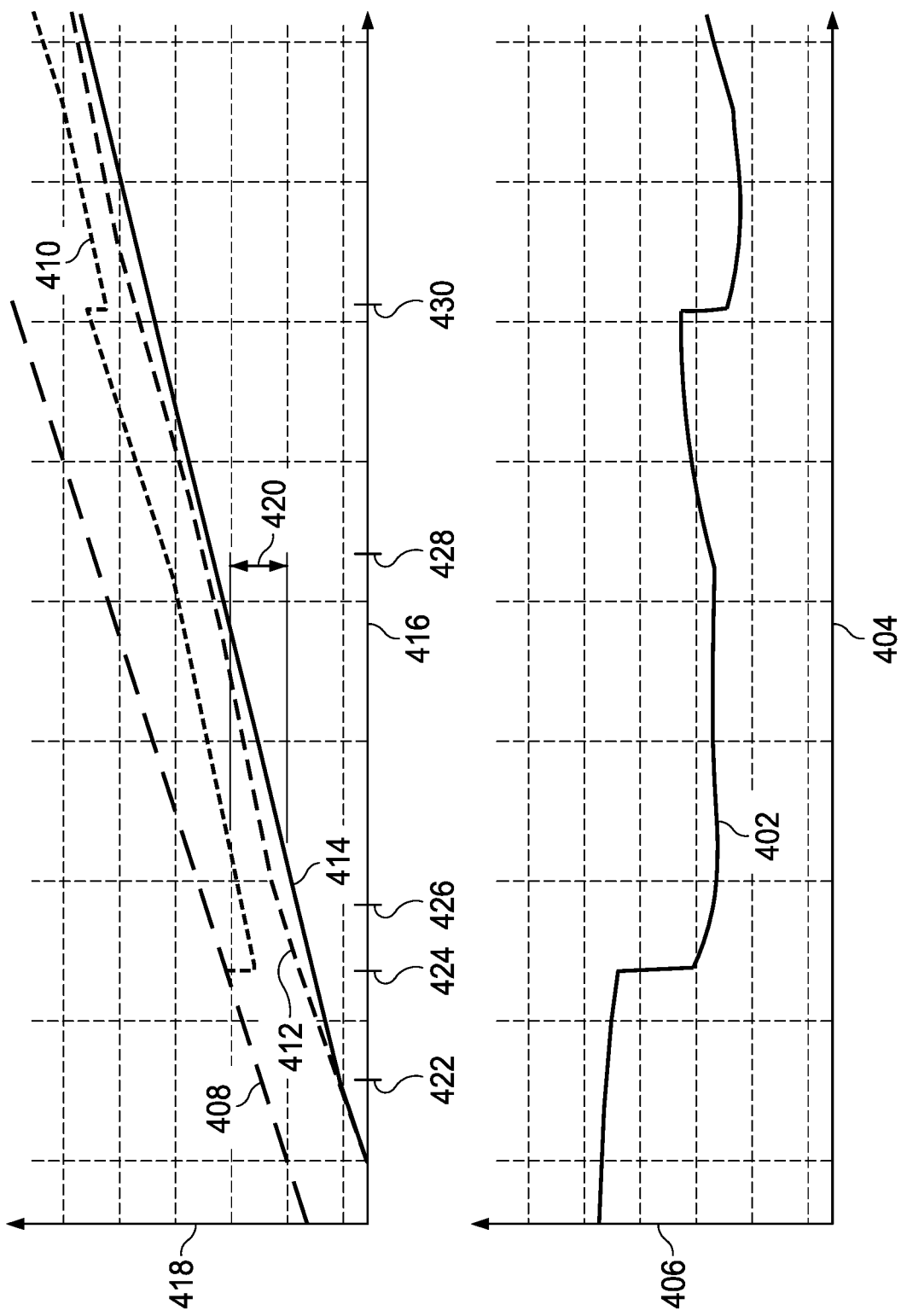

CONTROL METHOD FOR PREVENTING DIFFERENCES BETWEEN ROTOR TILT ANGLES IN A FLY-BY-WIRE TILTROTOR AIRCRAFT

BACKGROUND

This section provides background information to facilitate a better understanding of the various aspects of the disclosure. It should be understood that the statements in this section of this document are to be read in this light, and not as admissions of prior art A configuration of a tiltrotor aircraft can have wing mounted nacelles or pylons that are rotated between a helicopter mode and an airplane mode. The right hand pylon and the left hand pylon each house a rotor system. A position command, directed by the pilot or flight control computer and common to both the right and left pylons, directs the pylons to transition to a desired pylon angle. During the transition, a conversion system attempts to ensure that the right pylon angle and the left pylon angle maintain the same angle to within a certain tolerance.

Factors beyond normal flight conditions such as a degraded pylon actuator may cause sudden and/or prolonged change of load or rate capability on a pylon and result in an asymmetric condition outside of the allowed tolerance. Current mitigation techniques react to the detected asymmetric condition and attempt to arrest the motion of the non-degraded pylon by freezing the position command. Inherent lag in the system allows the asymmetric condition to increase before complete freezing of the pylon is achieved. Freezing of the position command itself in reaction to an asymmetric condition may prevent further asymmetry (after the lag catches up) but does not guarantee prevention of the asymmetric condition in the first place. Prevention of further asymmetry is accomplished by setting of conversion system brakes when a certain amount of asymmetry is detected. Once conversion system brakes are tripped, pilot troubleshooting is required to resolve the asymmetric condition before operation of the pylons can resume. Further, if the degraded condition persists, the conversion system brakes may continue to be re-activated.

SUMMARY

An example of a conversion system for a tiltrotor aircraft includes a first rotor system mounted to a wing member and pivotable through a range of pylon angles, a second rotor system mounted to the wing member and pivotable through the range of pylon angles, a set of actuators connected to the first rotor system and the second rotor system, a set of transducers connected to the set of actuators and a flight control computer in communication with the set of actuators and the set of transducers, the flight control computer to transmit a pylon command to the set of actuators to pivot the first rotor system and the second rotor system, and the flight control computer to transmit a first pylon command adjustment to the set of actuators when a difference between a first rotor system pylon angle and a second rotor system pylon angle exceeds a first asymmetry threshold.

An example method for preventing a maximum asymmetric condition between a first rotor system mounted to a wing member and pivotable through a range of pylon angles and a second rotor system mounted to the wing member and pivotable through the range of pylon angles in a tiltrotor aircraft includes transmitting a pylon command and adjusting the pylon command in response to a first pylon asymmetry exceeding a first asymmetry threshold.

An example method includes transitioning a fly-by-wire tiltrotor aircraft between an airplane mode and a helicopter mode, the tiltrotor aircraft comprising a first rotor system and a second rotor system, transmitting an original pylon command to move the first rotor system and the second rotor system, determining a difference between a first pylon angle associated with the first rotor system and a second pylon angle associated with the second rotor system, comparing the difference to an asymmetry threshold, and adjusting the original pylon command to a current pylon command if the difference exceeds the asymmetry threshold.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

FIG. 4 is a graph of pylon command adjustments over time according to an embodiment.

DETAILED DESCRIPTION

Figure 1:
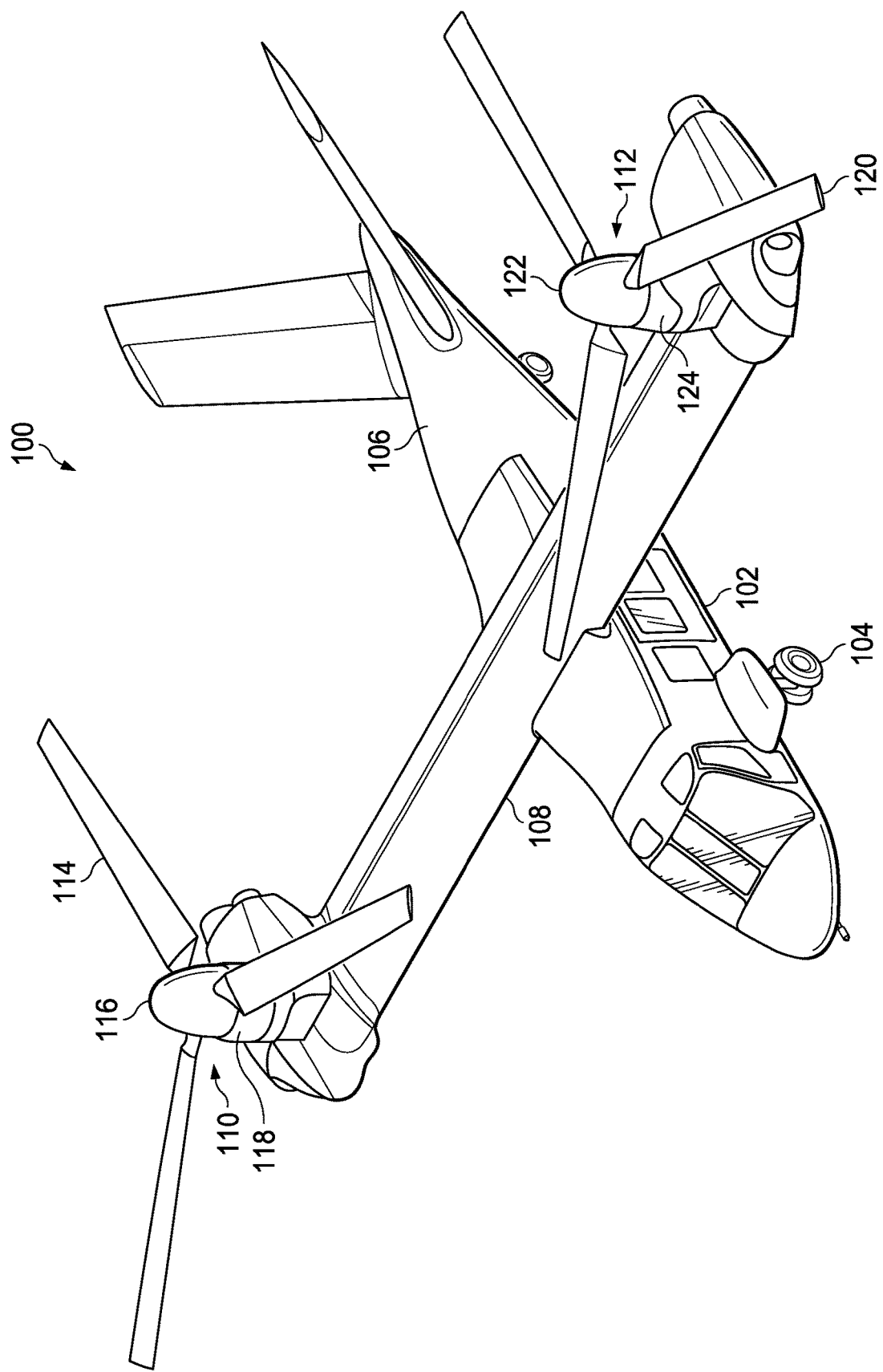
FIG. 1 is a perspective view of a tilitrotor aircraft in helicopter mode according to an embodiment.

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

Figure 2:
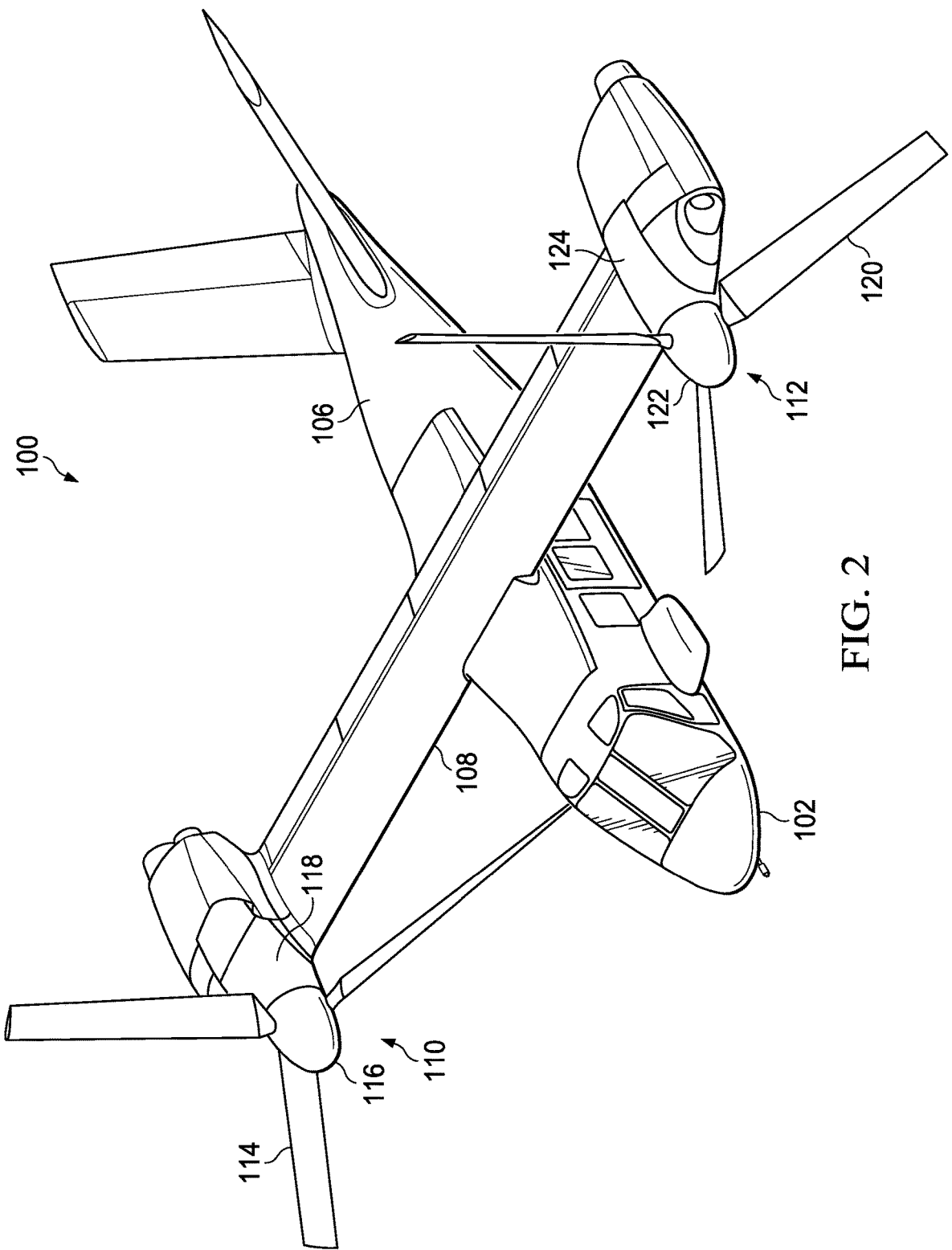
FIG. 2 is a perspective view of a tilitrotor aircraft in airplane mode according to an embodiment.

Referring to FIGS. 1 and 2, an illustrative tiltrotor aircraft 100 is shown. Tiltrotor aircraft 100 includes fuselage 102, landing gear 104, tail member 106, wing 108, rotor system 110, and rotor system 112. While depicted as a single wing 108, it is to be understood that the wing may be formed from separate components such that two or more wing members are coupled to opposite sides of fuselage 102. Rotor system 110 is located on an end portion of a first side of wing 108, while rotor system 112 is located on an end portion of a second side of wing 108. Rotor system 110 and rotor system 112 are substantially symmetric of each other about fuselage 102. Rotor system 110 includes a plurality of rotor blades 114 extending from hub 116. Hub 116 is operatively connected to pylon 118. Rotor system 112 includes a plurality of rotor blades 120 extending from hub 122. Hub 122 is operatively connected to pylon 124. Rotor blades 114 and 120 may rotate in opposite directions to cancel the torque associated with the operation of each rotor system 110 and 112. The position of rotor systems 110 and 112, as well as the pitch of rotor blades 114 and 120, can be selectively controlled in order to selectively control direction, thrust, and lift of tiltrotor aircraft 100. Further, rotor systems 110 and 112 are illustrated in the context of tiltrotor aircraft 100; however, rotor systems 110 and 112 can be implemented on other tiltrotor aircraft. For example, tiltrotor aircraft 100 may include a quad tiltrotor that has an additional wing aft of wing 108; the additional wing can have additional rotor systems similar to rotor systems 110 and 112.

FIG. 1 illustrates tiltrotor aircraft 100 in helicopter mode, in which rotor systems 110 and 112 are positioned substantially vertical to provide a lifting thrust. FIG. 2 illustrates tiltrotor aircraft 100 in an airplane mode, in which rotor systems 110 and 112 are positioned substantially horizontal to provide a forward thrust in which a lifting force is supplied by wing 108. It should be appreciated that tiltrotor aircraft 100 can be operated such that rotor systems 110 and 112 may be selectively positioned between airplane mode and helicopter mode, which can be referred to as a conversion mode.

During transition between airplane mode and helicopter mode the rotor systems rotate between a generally horizontal orientation and a generally vertical orientation through a range of pylon angles. At any time, the positions of each rotor system can be referred to as a right pylon angle and a left pylon angle. The right pylon angle may differ from the left pylon angle as the rotor systems may not move through the transition between airplane mode and helicopter mode at the same rate. Any difference between the right pylon angle and the left pylon angle during the transition is referred to as pylon asymmetry. Differences between the right pylon angle and the left pylon angle due to normal flight dynamics and other aerial loads are typically accounted for in the overall design of the conversion system such that any asymmetry due to such things would be negligible and not requiring notification to the flight crew.

Figure 3:
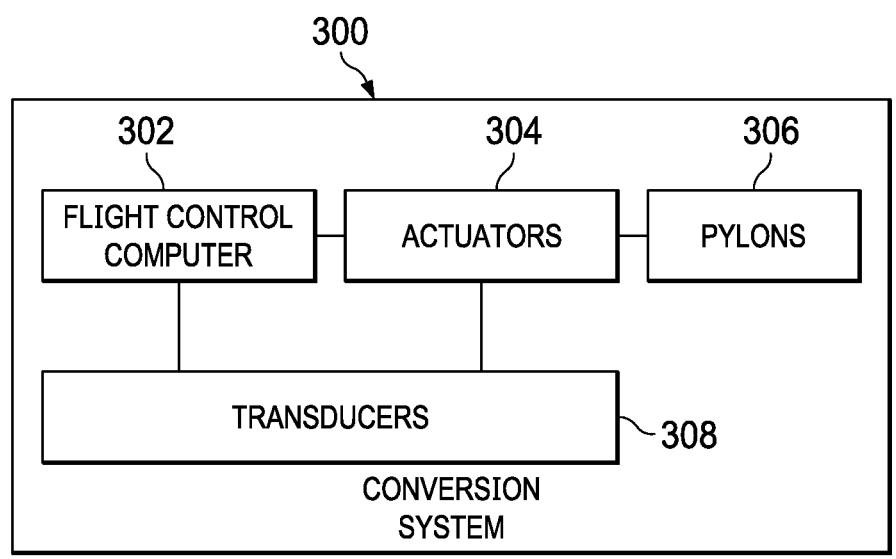
FIG. 3 is a schematic of a conversion system according to an embodiment.

Referring to FIG. 3, tiltrotor aircraft 100 includes conversion system 300. Conversion system 300 monitors the pylon position of each pylon during flight and during a transition between airplane mode and helicopter mode. Conversion system 300 includes flight control computer 302 operatively connected to actuators 304. Actuators 304 are attached to pylons 306. Pylons 306 include both pylon 118 and pylon 124. Actuators 304 include a separate set of actuators connected to each pylon 118 and 124. Transducers 308 are connected to both flight control computer 302 and actuators 304. Based on a pylon command received from the pilot or initiated by flight control algorithms that dynamically establish necessary pylon angles based on current flight conditions, the flight control computer signals the set of actuators to impart movement on the pylons to transition the pylons between a helicopter position and an airplane position or maintain flight. The pylon command may be derived by a desired pylon position or a desired pylon rate.

Conversion system 300 utilizes transducers 308 which measure the pylon angle of pylons 306. Based on the current measured pylon positions received from transducers 308 and the pylon command received from the flight crew or flight algorithms, flight control computer 302 determines a rate vector to be imparted on pylons 306 in order to move each pylon to the desired pylon position. Flight control computer 302 sends the rate vector signal to actuators 304. Actuators 304 impart a force on pylons 306 in order to move the pylons toward the desired position at the desired rate. Although each pylon is moving to a common desired position, the rate vectors on each pylon may be different since each is based on the position measurement local to each pylon and each pylon may be subject to different aerodynamic loads. Additionally, the force imparted on the pylon by the actuator will move the pylon toward the desired pylon position, but because of inertia, the pylon position can and typically will lag the pylon command.

In normal operation, based on the pylon command, each pylon progresses at the desired pylon rate once the effects of inertia are overcome. Desired pylon rates may range, for example, from about zero to ten degrees per second (0°-1°/sec). In the event of a degraded pylon, such that one of the pylons is incapable of progressing at the desired pylon rate, conversion system 300 prevents any resulting asymmetric condition from escalating beyond a maximum asymmetric condition. Maximum asymmetric conditions may range, for example, from about two to six degrees (2°-6°) depending on aircraft design and resulting flying qualities. A degraded pylon may be the result of hydraulic flow restrictions, electro-hydraulic valve failures, actuator deformation or bearing race contamination, or redundant conversion system actuator force fight. A degraded pylon does not move at the desired pylon rate. Since the non-degraded pylon is moving toward the desired pylon position at the desired pylon rate, an asymmetric condition is probable. Conversion system 300 monitors the difference between pylon angles and prevents maximum asymmetry from occurring.

Referring to FIG. 4, a graph of illustrative pylon command adjustments over time made by an illustrative conversion system is shown. Adjusted pylon rate vector 402 of a non-degraded pylon is shown on X-axis 404 and Y-axis 406. X-axis 404 is time in seconds. Each increment of X-axis 404 may range from about 0.5 to 2.5 seconds. Y-axis 406 is the pylon rate vector in degrees/second. Each increment of Y-axis 406 may range from about 0.5 to 3.0 degrees/second.

Desired pylon position command 408, adjusted pylon position command 410, measured pylon position of non-degraded pylon 412, and measured pylon position of degraded pylon 414 are shown on X-axis 416 and Y-axis 418. X-axis 416 is time in seconds. Each increment of X-axis 416 may range from about 0.5 to 2.5 seconds. Y-axis 418 is pylon position in degrees. Each increment of Y-axis 418 may range from about three to twenty degrees. A maximum asymmetry threshold ("Max Asym") 420, is the maximum allowed difference in pylon position between measured pylon position of non-degraded pylon 412 and measured pylon position of degraded pylon 414 at any point in time. Max Asym 420 may range, for example, from about two to six degrees (2°-6°). The conversion system prevents the difference between the measured pylon position of the non-degraded pylon and the measured pylon position of the degraded pylon from exceeding Max Asym 420.

At time 422, one pylon becomes degraded. Since the pylon rate of the degraded pylon cannot keep up with the pylon rate of the non-degraded pylon, measured pylon position of non-degraded pylon 412 begins to differ from measured pylon position of degraded pylon 414. At time 424, the illustrative conversion system determines the difference between the pylon angles of the degraded pylon and the non-degraded pylon. Since the difference in pylon angles exceeds a predetermined asymmetry threshold, where the asymmetry threshold is a percentage of Max Asym 420, the conversion system may adjust desired pylon position command 408 to adjusted pylon position command 410 at time 424. The conversion system may also reduce adjusted pylon rate vector 402 by a percentage. At time 426, due to the pylon position command adjustment and/or pylon rate adjustment made, the difference between the pylon angles of the degraded pylon and the non-degraded pylon begins to lessen. At time 428, the illustrative conversion system determines the difference between the pylon angles of the degraded pylon and the non-degraded pylon. Since the difference in pylon angles has resolved to within the predetermined asymmetry threshold, the conversion system may raise adjusted pylon rate vector 402. At time 430, the illustrative conversion system determines the difference between the pylon angles of the degraded pylon and the non-degraded pylon. Since the difference in pylon angles exceeds the predetermined asymmetry threshold, the conversion system may adjust the adjusted pylon position command 410 at time 430. The conversion system may also reduce adjusted pylon rate vector 402 by a percentage. The conversion system may continue to monitor any differences between pylon angles until the aircraft touches down.

Figure 5A:
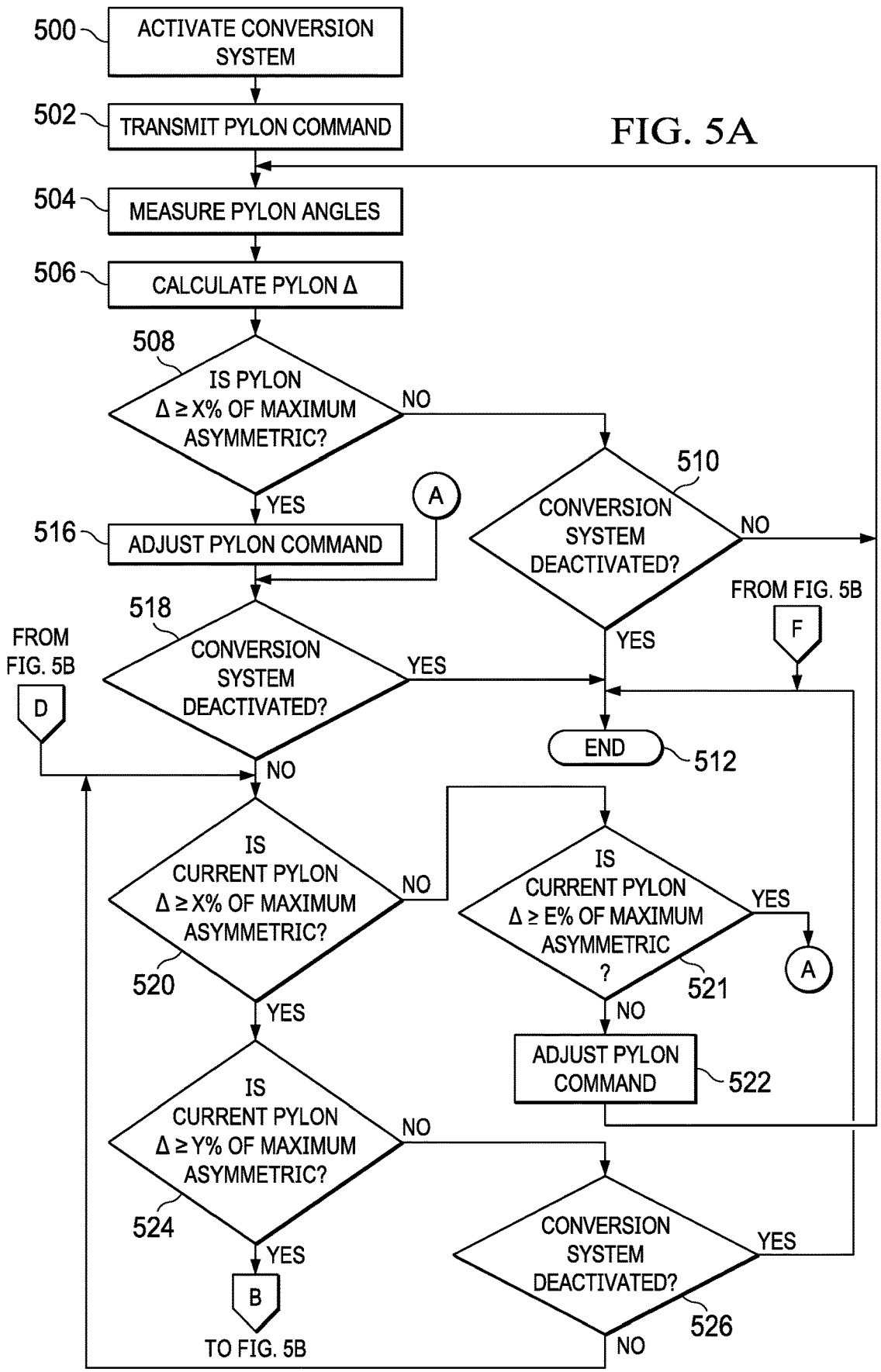
FIG. 5A is a flowchart of a conversion system according to an embodiment.
Figure 5B:
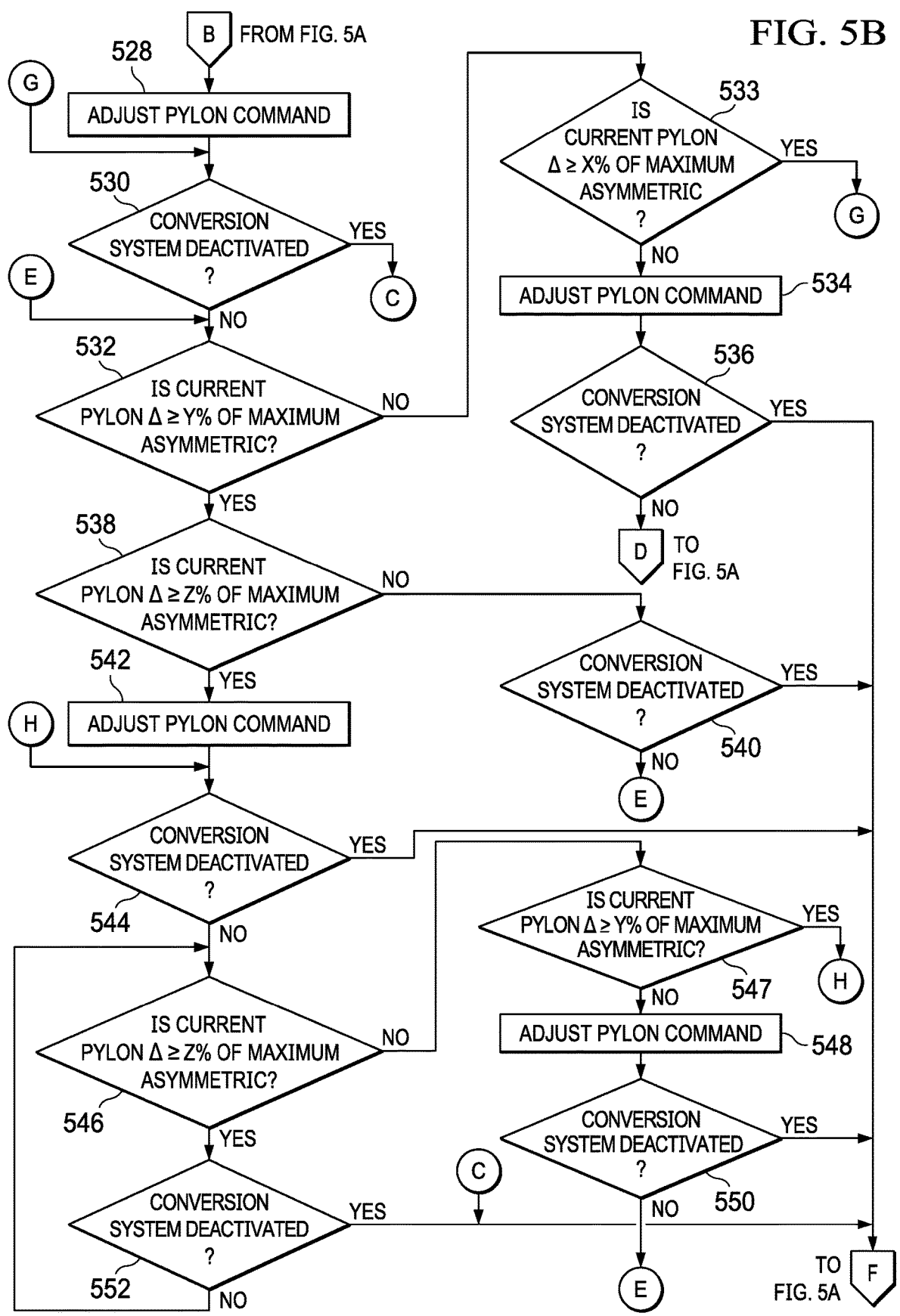
FIG. 5B is a flowchart of a conversion system according to an embodiment.

Referring to FIGS. 5A and 5B, the actions performed by an illustrative conversion system 300 to prevent exceeding a maximum asymmetric condition between pylons of a tiltrotor aircraft are shown. At block 500, conversion system 300 is activated. The conversion system monitors the pylon angles of pylons 118 and 124 during operation of the tiltrotor aircraft. At block 502, the flight control computer transmits a pylon command to the actuators such that the actuators begin moving the pylons toward a desired pylon position at a desired pylon rate. At block 504, the transducers measure the pylon angle of pylon 118 and pylon 124. At block 506, flight control computer 302 determines the difference between the pylon angle of pylon 118 and the pylon angle of pylon 124, hereinafter referred to as pylon Δ. At block 508, the flight control computer compares the pylon Δ to a preset maximum allowable asymmetric condition Max Asym 420. If the pylon Δ is not greater than or equal to a first asymmetry threshold, X % of the Max Asym, then at block 510 the flight control computer determines if the conversion system has been deactivated. In an illustrative embodiment, X % may range from about 25% to 55%. If the conversion system has not been deactivated, return to block 504. If the conversion system has been deactivated, then at block 512, the conversion system ends. The conversion system monitors any differences between pylon angles due to transitioning pylons or other aerodynamic loads until the conversion system is deactivated. The conversion system may be deactivated by the pilot or when the aircraft is no longer in flight.

If at block 508 the pylon Δ is greater than or equal to X % of the Max Asym, then at block 516, the flight control computer adjusts the pylon command.

In an illustrative embodiment, the flight control computer adjusts the pylon command by a pylon rate adjustment to B % of the desired pylon rate. In an illustrative embodiment, B % may range from about 50% to 80%.

In an illustrative embodiment, to address the effects of actuator inertia, the flight control computer adjusts the pylon command by a pylon position adjustment. The pylon position adjustment may be to D % of the way between the pylon command and the current measured pylon position of the pylon nearer the command. In an illustrative embodiment, D % may range from about 25-60% of the distance between the desired pylon position and the current measured pylon position.

In an illustrative embodiment, the flight control computer adjusts the pylon command by both a pylon rate adjustment to B % of the desired pylon rate and by a pylon position adjustment to D % of the way between the pylon command and the current measured pylon position of the pylon nearer the command. It is possible that manipulation of the pylon rate alone, even to zero, may still allow the non-degraded pylon to continue moving away from the degraded pylon to a significant degree because the actuator position is lagging the position command. Therefore, as increasing levels of asymmetry are detected, in addition to pylon rate reductions, the target pylon position can be adjusted toward or immediately changed to a point in the direction of the degraded pylon. The amount the pylon position and/or pylon rate is adjusted may be a factor of the maximum operating pylon rate, the Max Asym being prevented, how severe the degradation may be, and the peak loads that can be tolerated.

At block 518 the flight control computer determines if the conversion system has been deactivated. If the conversion system has been deactivated, return to block 512. If the conversion system has not been deactivated, proceed to block 520. At block 520, the pylon angles are measured and if the current pylon Δ is not greater than or equal to X % of the Max Asym proceed to block 521. At block 521, if the current pylon Δ is not greater than or equal to a recovering asymmetry threshold, E % of the Max Asym, proceed to block 522. In an illustrative embodiment, E % may range from about 5% to 35%. At block 522, the flight control computer adjusts the pylon command. In an illustrative embodiment, the flight control computer adjusts the pylon command by a pylon rate adjustment to 100% of the desired pylon rate. In an illustrative embodiment, the flight control computer adjusts the pylon command by a pylon position adjustment back to the desired pylon position. In an illustrative embodiment, the flight control computer adjusts the pylon command by both a pylon rate adjustment to 100% of the desired pylon rate and by a pylon position adjustment back to the desired pylon position. At block 521, if the pylon Δ is greater than or equal to E % of the Max Asym, return to block 518. At block 520, if the pylon Δ is greater than or equal to X % of the Max Asym, proceed to block 524.

At block 524, if the current pylon Δ is not greater than or equal to a second asymmetry threshold, Y % of the Max Asym, proceed to block 526. In an illustrative embodiment, Y % may range from about 45% to 75%. At block 526 the flight control computer determines if the conversion system has been deactivated. If the conversion system has not been deactivated, return to block 520. If the conversion system has been deactivated, return to block 512. At block 524, if the pylon Δ is greater than or equal to Y % of the Max Asym, proceed to block 528. At block 528, the flight control computer adjusts the pylon command.

In an illustrative embodiment, the flight control computer adjusts the pylon command by a pylon rate adjustment to C % of the desired pylon rate. In an illustrative embodiment, C % may range from about 20% to 50%.

In an illustrative embodiment, the flight control computer adjusts the pylon command by a pylon position adjustment. The pylon position adjustment may be to D % of the way between the current target pylon position and the current measured pylon position of the pylon nearer the command.

In an illustrative embodiment, the flight control computer adjusts the pylon command by both a pylon rate adjustment to C % of the desired pylon rate and by a pylon position adjustment to D % of the way between the current target pylon position and the current measured pylon position.

At block 530 the flight control computer determines if the conversion system has been deactivated. If the conversion system has been deactivated, return to block 512. If the conversion system has not been deactivated, proceed to block 532. At block 532, the pylon angles are measured and if the current pylon Δ is not greater than or equal to Y % of the Max Asym proceed to block 533. At block 533, if the pylon Δ is not greater than or equal to a recovering asymmetry threshold, X % of the Max Asym, proceed to block 534. At block 534, the flight control computer adjusts the pylon command. In an illustrative embodiment, the flight control computer adjusts the pylon command by a pylon rate adjustment to B % of the desired pylon rate. In an illustrative embodiment, the flight control computer adjusts the pylon command by a pylon position adjustment to D % of the way between the desired pylon position and the current measured pylon position. In an illustrative embodiment, the flight control computer adjusts the pylon command by both a pylon rate adjustment to B % of the desired pylon rate and by a pylon position adjustment to D % of the way between the desired pylon position and the current measured pylon position. At block 533, if the current pylon Δ is greater than or equal to X % of the Max Asym, return to block 530. At block 532 if the pylon Δ is greater than or equal to Y % of the Max Asym, proceed to block 538.

At block 536, the flight control computer determines if the conversion system has been deactivated. If the conversion system has been deactivated, return to block 512. If the conversion system has not been deactivated, return to block 520. At block 532, if the pylon Δ is greater than or equal to Y % of the Max Asym, proceed to block 538.

At block 538, if the current pylon Δ is not greater than or equal to a third asymmetry threshold, Z % of the Max Asym, proceed to block 540. In an illustrative embodiment, Z % may range from about 65% to 95%. At block 540 the flight control computer determines if the conversion system has been deactivated. If the conversion system has not been deactivated, return to block 532. If the conversion system has been deactivated, return to block 512. At block 538, if the pylon Δ is greater than or equal to Z % of the Max Asym, proceed to block 542. At block 542, the flight control computer adjusts the pylon command. In an illustrative embodiment, the flight control computer adjusts the pylon command by a pylon rate adjustment to 0% of the desired pylon rate. In an illustrative embodiment, the flight control computer adjusts the pylon command by a pylon position adjustment. The pylon position adjustment may be to D % of the way between the current target pylon position and the current measured pylon position of the pylon nearer the current command. In an illustrative embodiment, the flight control computer adjusts the pylon command by both a pylon rate adjustment to 0% of the desired pylon rate and by a pylon position adjustment to D % of the way between the current target pylon position and the current measured pylon position.

At block 544 the flight control computer determines if the conversion system has been deactivated. If the conversion system has been deactivated, return to block 512. If the conversion system has not been deactivated, proceed to block 546. At block 546, the pylon angles are measured and if the current pylon Δ is not greater than or equal to Z % of the Max Asym proceed to block 547. At block 547, if the current pylon Δ is not greater than or equal to a recovering asymmetry threshold, Y % of the Max Asym, proceed to block 548. At block 548, the flight control computer adjusts the pylon command. In an illustrative embodiment, the flight control computer adjusts the pylon command by a pylon rate adjustment C % of the desired pylon rate. In an illustrative embodiment, the flight control computer adjusts the pylon command by a pylon position adjustment to D % of the way between the current target pylon position and the current measured pylon position. In an illustrative embodiment, the flight control computer adjusts the pylon command by both a pylon rate adjustment to C % of the desired pylon rate and by a pylon position adjustment to D % of the way between the current target pylon position and the current measured pylon position. At block 547, if the pylon Δ is greater than or equal to Y % of the Max Asym, return to block 544. At block 546, if the pylon Δ is greater than or equal to Z % of the Max Asym, proceed to block 552.

At block 550, the flight control computer determines if the conversion system has been deactivated. If the conversion system has been deactivated, return to block 512. If the conversion system has not been deactivated, return to block 532.

At block 552, the flight control computer determines if the conversion system has been deactivated. If the conversion system has been deactivated, return to block 512. If the conversion system has not been deactivated, return to block 546.

The pylon measurements and resulting adjustments occur in a step-wise fashion. In an illustrative embodiment, more or fewer steps may be used.

An intentional amount of time delay could be built in to the conversion system after each incremental pylon rate and/or pylon position adjustment. The amount of delay may range from about 0.5 to 1.5 seconds. The delay between adjustments isolates minor pylon oscillations from affecting any flight dynamics algorithms and causing any further undesired dynamic interaction between the pylons. The delay is a minimum time to hold a pylon command adjustment as the asymmetric condition is being resolved. If the asymmetric condition is worsening, there is no delay. In some embodiments where aircraft structural modes and pylon dynamics are not a concern, delay after each pylon command adjustment may not be necessary resulting in the pylon measurements and pylon adjustments occurring more rapidly in a linear fashion.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed:

1. A conversion system for a tiltrotor aircraft, comprising:
   a first rotor system mounted to a wing member and pivotable through a range of pylon angles;
   a second rotor system mounted to the wing member and pivotable through the range of pylon angles;
   a set of actuators connected to the first rotor system and the second rotor system;

a set of transducers connected to the set of actuators; and
a flight control computer in communication with the set of actuators and the set of transducers;
wherein the flight control computer:
  transmits a pylon command to the set of actuators to pivot the first rotor system and the second rotor system, the pylon command separately specifying, at least in part, desired movement of each of the first rotor system and second rotor system;
  detects an asymmetric condition between the first rotor system and the second rotor system when a difference between a first pylon angle of the first rotor system and a second pylon angle of the second rotor system exceeds a first asymmetry threshold; and
  transmits a first pylon command adjustment to the set of actuators in response to the asymmetric condition.

2. The conversion system of claim 1, wherein:
the flight control computer to transmit a second pylon command adjustment, subsequent to the first pylon command adjustment, when a secondary difference between the first pylon angle and the second pylon angle, subsequent to the difference, exceeds a second asymmetry threshold; and
wherein the second asymmetry threshold is greater than the first asymmetry threshold.

3. The conversion system of claim 2, wherein:
the flight control computer to transmit a third pylon command adjustment, subsequent to the second pylon command adjustment, when a tertiary difference between the first pylon angle and the second pylon angle, subsequent to the secondary difference, exceeds a third asymmetry threshold; and
wherein the third asymmetry threshold is greater than the second asymmetry threshold.

4. The conversion system of claim 1, wherein the first pylon command adjustment includes a pylon rate adjustment.

5. The conversion system of claim 1, wherein the first pylon command adjustment includes a pylon position adjustment.

6. The conversion system of claim 1, wherein the first pylon command adjustment includes a pylon rate adjustment and a pylon position adjustment.

7. A method for preventing a maximum asymmetric condition between a first rotor system mounted to a wing member and pivotable through a range of pylon angles and a second rotor system mounted to the wing member and pivotable through the range of pylon angles in a tiltrotor aircraft, comprising:
  transmitting, to a set of actuators connected to the first rotor system and the second rotor system, a pylon command to pivot the first rotor system and the second rotor system, the pylon command separately specifying, at least in part, desired movement of each of the first rotor system and second rotor system;
  detecting an asymmetric condition between the first rotor system and the second rotor system in response to a first pylon asymmetry exceeding a first asymmetry threshold, the first pylon asymmetry comprising a difference between a first pylon angle of the first rotor system and a second pylon angle of the second rotor system; and
  adjusting the pylon command to a current pylon command in response to the asymmetric condition.

8. The method of claim 7, wherein the pylon command includes one selected from the group of a pylon rate or a pylon position.

9. The method of claim 7, further comprising adjusting the current pylon command to a latest pylon command in response to a second pylon asymmetry, subsequent to the first pylon asymmetry, exceeding a second asymmetry threshold.

10. The method of claim 7, further comprising:
  adjusting the current pylon command to a latest pylon command in response to a second pylon asymmetry, subsequent to the first pylon asymmetry, exceeding a second asymmetry threshold; and,
  adjusting the latest pylon command in response to a third pylon asymmetry, subsequent to the second pylon asymmetry, exceeding a third asymmetry threshold.

11. A method, comprising:
  transitioning a fly-by-wire tiltrotor aircraft between an airplane mode and a helicopter mode, the tiltrotor aircraft comprising a first rotor system and a second rotor system;
  transmitting an original pylon command to move the first rotor system and the second rotor system, the original pylon command separately specifying, at least in part, desired movement of each of the first rotor system and the second rotor system;
  determining a difference between a first pylon angle associated with the first rotor system and a second pylon angle associated with the second rotor system;
  comparing the difference to an asymmetry threshold;
  detecting an asymmetric condition between the first rotor system and the second rotor system if the difference exceeds the asymmetry threshold; and
  adjusting the original pylon command to a current pylon command in response to the asymmetric condition.

12. The method of claim 11 wherein the adjusting the original pylon command includes adjusting a pylon rate.

13. The method of claim 11 wherein the adjusting the original pylon command includes adjusting a pylon position.

14. The method of claim 11, wherein:
the original pylon command includes a pylon rate; and
the adjusting the original pylon command comprises adjusting the pylon rate to about 50-80% of the pylon rate.

15. The method of claim 11, wherein:
the original pylon command includes a pylon position; and
the adjusting the original pylon command comprises adjusting the pylon position to about 25-60% of the pylon position.

16. The method of claim 11, further comprising adjusting the current pylon command to a latest pylon command if a secondary difference between the first pylon angle and the second pylon angle, subsequent to the difference, exceeds a second asymmetry threshold where the second asymmetry threshold is greater than the asymmetry threshold.

17. The method of claim 16, wherein:
the original pylon command includes a pylon rate;
the current pylon command includes a current pylon rate; and
adjusting the current pylon command comprises adjusting the current pylon rate to between 20-50% of the pylon rate.

18. The method of claim 11, further comprising:
  adjusting the current pylon command to a latest pylon command if a secondary difference between the first pylon angle and the second pylon angle, subsequent to the difference, exceeds a second asymmetry threshold where the second asymmetry threshold is greater than the asymmetry threshold; and adjusting the latest pylon command if a tertiary difference between the first pylon angle and the second pylon angle, subsequent to the secondary difference, exceeds a third asymmetry threshold where the third asymmetry threshold is greater than the second asymmetry threshold.

19. The method of claim 18, wherein:

the original pylon command includes a pylon rate;

the current pylon command includes a current pylon rate;

the latest pylon command includes a latest pylon rate;

adjusting the current pylon command comprises adjusting the current pylon rate to between 20-50% of the pylon rate; and adjusting the latest pylon command comprises adjusting the latest pylon rate to 0% of the pylon rate.

20. The method of claim 11, wherein adjusting the original pylon command prevents the difference between the first pylon angle and the second pylon angle from exceeding a maximum threshold.

* * * * *